United States Patent Office 2,960,529
Patented Nov. 15, 1960

2,960,529
PROCESS FOR PREPARING NEUTRAL PHOSPHATES

Marvin A. McCall and Harry W. Coover, Jr., Kingsport, Tenn., assignors to Eastman Kodak Company, Rochester, N.Y., a corporation of New Jersey No Drawing. Filed Oct. 29, 1959, Ser. No. 849,462

6 Claims. (Cl. 260—461)

This invention relates to a novel process for the preparation of organophosphorus compounds. In a specific aspect the invention relates to a novel process for preparing neutral phosphates.

The value and importance of organophosphorus compounds has been established for a number of years in many fields of activity. This valuable group of chemical compounds has been used as insecticides, stabilizers for resins, such as polyesters and the like, fungicides, lubricating oil additives, plasticizers and other related uses. Therefore, it is of considerable importance to have a method for preparing organophosphorus compounds which is advantageous not only in its advance over prior art methods but also in its adaptation to commercial production. Accordingly, it is an object of this invention to provide a new and valuable process for the production or organophosphorus compounds. It is another object of this invention to provide a new and valuable process for preparing neutral phosphates. It is a further object of this invention to provide a novel method for preparing organophosphorus compounds that is readily adaptable to commercial exploitation and that also results in the preparation of valuable by-products. These and other objects will be apparent from the detailed description of our invention that appears below.

In accordance with our invention, we have found that neutral phosphates can be prepared by reacting a phosphite with phosphoric acid or a substituted phosphoric acid and the reaction that takes place in practicing, our invention is illustrated by the following general equation:

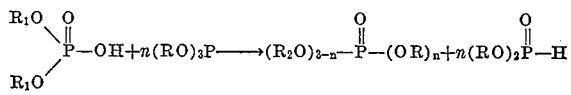

wherein each R is a radical selected from the group consisting of lower alkyl radicals containing 1–4 carbon atoms and phenyl, each $R_1$ is a radical selected from the group consisting of hydrogen, alkyl containing 1–16 carbon atoms, alkoxy containing 1–4 carbon atoms, phenyl, benzyl and halophenyl, each $R_2$ is selected from the group consisting of alkyl containing 1–16 carbon atoms, alkoxy containing 1–4 carbon atoms, phenyl, benzyl and halophenyl, and $n$ is an integer from 1–3 and equal to the number of hydrogen atoms attached through an oxygen to the phosphorus atom in the phosphoric acid or substituted phosphoric acid that is employed as a reactant in our process. It will be understood that when $R_1$ is a radical other than hydrogen $R_2$ will be identical to $R_1$. When $R_1$ is hydrogen $R_2$ will be identical to R. The reactions that can take place in accordance with applicants' invention are illustrated by the following equations wherein illustrative reactants are employed.

$$HO-\overset{O}{\underset{OH}{\overset{\|}{P}}}-OH+3(C_2H_5O)_3P \longrightarrow (C_2H_5O)_3P=O+3(C_2H_5O)_2\overset{O}{\overset{\|}{P}}=H$$

$$C_2H_5O-\overset{O}{\underset{OH}{\overset{\|}{P}}}-OH+2(C_2H_5O)_3P \longrightarrow$$

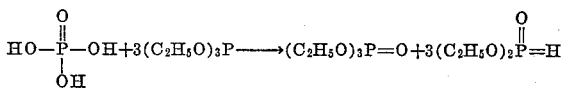

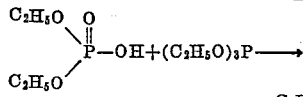

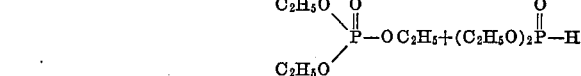

In carrying out our process the reaction can be effected by slowly adding the phosphite reactant to the phosphoric acid or the substituted phosphoric acid, and it is preferred to agitate the mixture of reactants. If desired, the order of addition of reactants can be reversed and the phosphoric acid or substituted phosphoric acid can be added slowly to the phosphite. The reaction is carried out at a temperature within the range of 0–200° C. and preferably the reaction temperature is maintained within the range of 50–120° C. by controlling the rate of addition of reactants or by external heating or cooling of the reaction chamber. The higher molecular weight reactants have been found to react rather slowly and for that reason in some instances it is necessary to apply heat to the reaction mixture in order to maintain the desired reaction temperature. After the addition of reactants has been completed the reaction mixture is maintained in the desired temperature range, for example, on a steam bath for a period of at least one hour. However, longer reaction times, for example, as long as six hours can be used. After the desired reaction has taken place the reaction products are readily recovered from the reaction mixture by distillation under reduced pressure.

The usefulness of the reaction is quite evident since the process offers an effective means for obtaining a wide variety of neutral symmetrical phosphates and neutral unsymmetrical phosphates which can be used as intermediates for the preparation of insecticides, fungicides, lubricating oil additives, plasticizers and the like. Symmetrical and unsymmetrical phosphates can be prepared with equal ease by selecting the proper phosphite and phosphoric acid or substituted phosphoric acid reactants. Additionally, the process of our invention offers an excellent means for producing hydrogen phosphites which are also useful as organophosphorus intermediates having considerable commercial value.

The following examples are illustrative of the practice of our invention.

EXAMPLE 1

*Triethyl phosphate and Diethyl hydrogen phosphite*

$(C_2H_5O)_3P=O$ and $(C_2H_5O)_2P(O)H$

Triethyl phosphite (0.2 mole) was added portionwise to diethyl phosphate (0.2 mole) with stirring. The mixture was heated for 1 hour at 100° C. then distilled under reduced pressure obtaining triethyl phosphate in a 71% yield, B.P. 90° C., at 10 mm. pressure and diethyl hydrogen phosphite in an 80% yield, B.P. 71° C., at 10 mm. pressure.

EXAMPLE 2

*Di-2-ethylhexyl ethyl phosphate and Diethyl hydrogen phosphite*

$$\overset{C_2H_5}{(C_4H_9\overset{|}{C}H-CH_2O)_2P(O)OC_2H_5} \text{ and } (C_2H_5O)_2P(O)H$$

A mixture (30.8 g.) consisting of di(2-ethylhexyl) phosphate (89.9%) and 2-ethylhexyl phosphate (3.9%) was reacted with 41.5 g. (0.25 mole) of triethyl phosphite by heating to 100° C. for 1 hour. The reaction was exothermic at this temperature and the pot temperature reached 140° C. for a short time. The reacted materials were then vacuum distilled obtaining diethyl hydrogen phosphite in a 72.5% yield and some unreacted

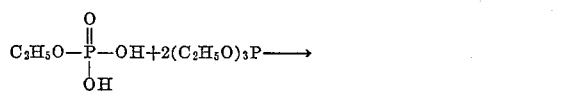

triethyl phosphite. Diethyl 2-ethylhexyl phosphate (9.8 g.) was obtained, B.P. 96–99° C. at 0.5 mm., $n_D^{20}$ 1.4279. Ethyl di-2-ethylhexyl phosphate (20.2 g.) was obtained, B.P. 133–140° C. at 0.5 mm., $n_D^{20}$ 1.4380.

EXAMPLE 3

*Triethyl phosphate and Diethyl hydrogen phosphite*

$(C_2H_5O)_3P=O$ and $(C_2H_5O)_2P(O)H$

Triethyl phosphite (99.7 g.) was placed in a round bottom flask equipped with a thermometer and magnetic stirrer. To this vigorously stirred phosphite was added dropwise 22.0 g. of 85% phosphoric acid with vigorous stirring. After the heat of reaction had subsided, the mixture was heated on a steam bath for 3–4 hours, then distilled under reduced pressure. Diethyl hydrogen phosphite (79.0 g.) and triethyl phosphate (10 g.) were obtained. The undistillable residue contained mono and diethyl phosphates (22 g.). These residues were treated with more triethyl phosphite to obtain an additional quantity of neutral triethyl phosphate (15.5 g.), or a total yield of 70% of neutral triethyl phosphate.

EXAMPLE 4

*Cetyl diethyl phosphate and Diethyl hydrogen phosphite*

$nC_{16}H_{33}OP(O)(OC_2H_5)_2 + (C_2H_5O)_2P(O)H$

Normal cetyl phosphate (0.1 mole, M.P. 75° C.) was dissolved in 30 cc. dry benzene. To this solution was added triethyl phosphite (0.25 mole) and the resulting mixture heated on a steam bath for 1 hour. The benzene was then distilled off and the mixture heated to 100° C. for 2 hours. The reaction mixture was then heated under vacuum and any unreacted triethyl phosphite removed, B.P. 48° C. at 10–11 mm. The remaining reaction product was then dissolved in benzene and the by-product, diethyl hydrogen phosphite, removed by washing with water. The product, cetyl diethyl phosphate, was then obtained by removing the benzene under vacuum. The product was a light brown, viscous oil.

EXAMPLE 5

*Methyl ethyl propyl phosphate and Dipropyl hydrogen phosphite*

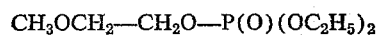
 and $(C_3H_7O)_2P(O)H$

Methyl ethyl phosphate (0.1 mole) was reacted with tripropyl phosphite in the same manner as described in Example 1. The dipropyl hydrogen phosphite was removed at 85–90° C. at 8 mm. pressure. A small amount of anhydrous $K_2CO_3$ was used as stabilizer during the distillation. The liquid remaining was primarily methyl ethyl propyl phosphate which could be distilled at 88–95° C. at 2 mm.

EXAMPLE 6

*Methoxyethyl diethyl phosphate and Diethyl hydrogen phosphite*

$CH_3OCH_2$—$CH_2O$—$P(O)(OC_2H_5)_2$ and $(C_2H_5O)_2P(O)H$

Methoxyethyl phosphate (0.1 mole) and triethyl phosphite (0.2 mole) were reacted in the same manner as described in Example 1 to produce diethyl hydrogen phosphite which was recovered by vacuum distillation. The resulting methoxyethyl diethyl phosphate was an amber colored oil.

EXAMPLE 7

*Benzyl diethyl phosphate and Diethyl hydrogen phosphite*

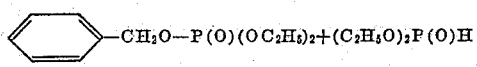

These materials were obtained by reacting benzyl ethyl phosphate with triethyl phosphite in the manner described in Example 4. The benzyl diethyl phosphate distills at 115–120° C. at 1.55 mm. pressure.

EXAMPLE 8

*Diethyl methyl phosphate and Diphenyl hydrogen phosphite*

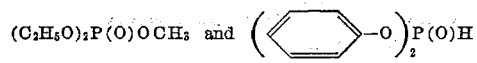

Diethyl phosphate (0.1 mole) was reacted with diphenyl methyl phosphite (0.1 mole) in the manner described in Example 1. The diethyl methyl phosphate was distilled from the reaction mixture at 88° to 95° C. at 8–10 mm. pressure.

EXAMPLE 9

*Di-(2-chlorophenyl) ethyl phosphate and Diethyl hydrogen phosphite*

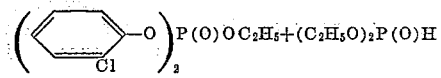

Di-(2-chlorophenyl) phosphate (0.1 mole) was reacted with triethyl phosphite (0.1 mole) according to the procedure for Example 4 to obtain the above products.

Although the invention has been described in considerable detail with reference to certain preferred embodiments thereof, variations and modifications can be effected within the spirit and scope of this invention as described hereinabove and as defined in the appended claims.

We claim:

1. The process for preparing neutral phosphates which comprises reacting a phosphite having the structural formula:

$(RO)_3P$ wherein each R is a radical selected from the group consisting of lower alkyl radicals containing 1–4 carbon atoms and phenyl with a phosphorus compound having the structural formula:

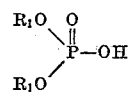

wherein each $R_1$ is a radical selected from the group consisting of hydrogen, alkyl containing 1–16 carbon atoms, alkoxy containing 1–4 carbon atoms, phenyl, benzyl and halophenyl at a temperature within the range of 0–200° C.

2. The method for producing triethyl phosphate and diethyl hydrogen phosphite which comprises reacting triethyl phosphite and diethyl phosphate at a temperature within the range of 0–200° C.

3. The method for producing di-2-ethylhexyl ethyl phosphate and diethyl hydrogen phosphite which comprises reacting di-2-ethylhexyl phosphate with triethyl phosphite at a temperature within the range of 0–200° C.

4. The process for producing methoxyethyl diethyl phosphate and diethyl hydrogen phosphite which comprises reacting methoxyethyl phosphate with triethyl phosphite at a temperature within the range of 0–200° C.

5. The process for producing benzyl diethyl phosphate and diethyl hydrogen phosphite which comprises reacting benzyl ethyl phosphate with triethyl phosphite at a temperature within the range of 0–200° C.

6. The method for producing di-(2-chlorophenyl)ethyl phosphate and diethyl hydrogen phosphite which comprises reacting di-(2-chlorophenyl) phosphate with triethyl phosphite at a temperature within the range of 0–200° C.

No references cited.